Patented Apr. 14, 1931

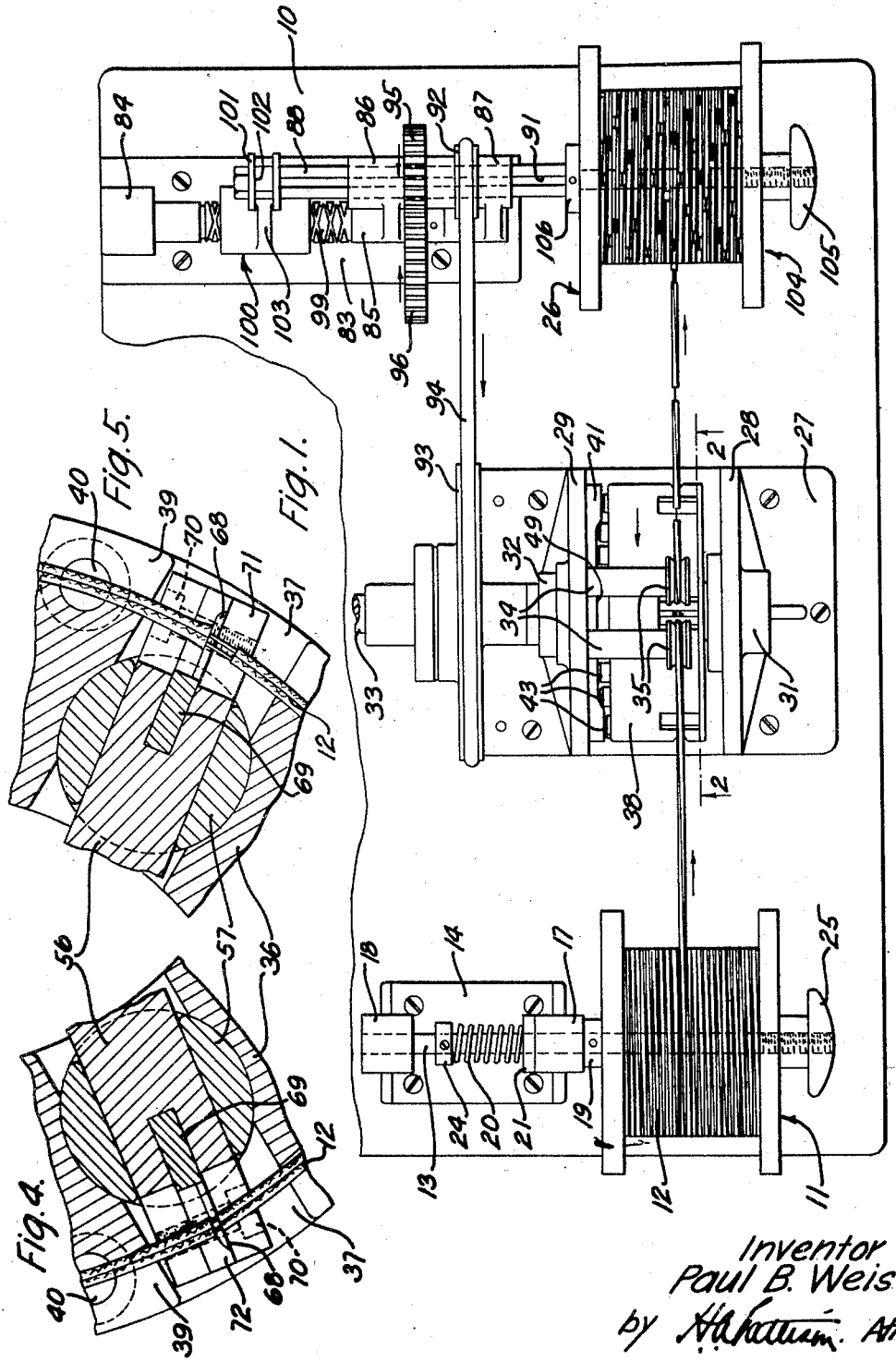

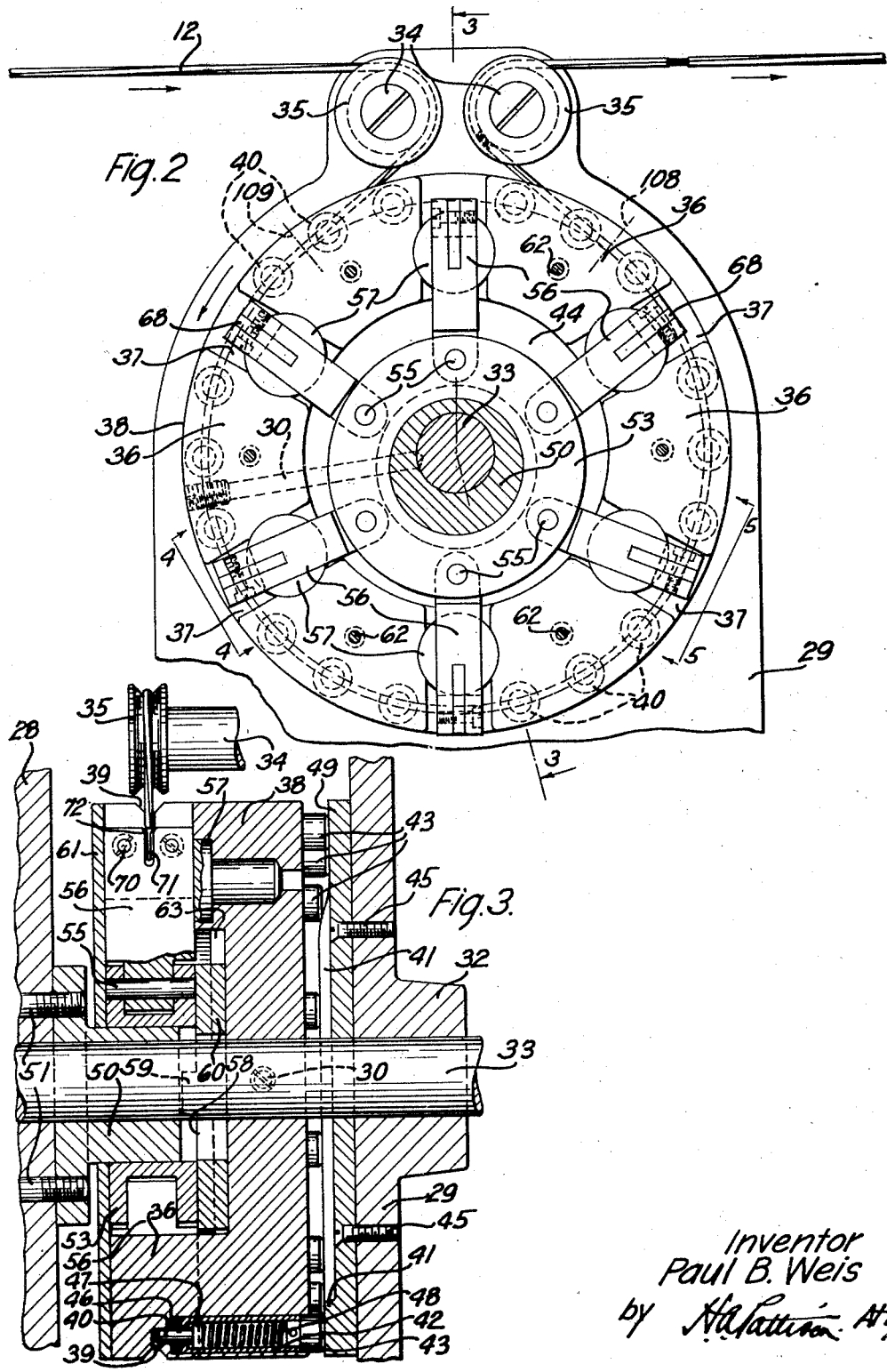

1,800,917

UNITED STATES PATENT OFFICE

PAUL B. WEIS, OF AURORA, ILLINOIS, ASSIGNOR TO WESTERN ELECTRIC COMPANY, INCORPORATED, OF NEW YORK, N. Y., A CORPORATION OF NEW YORK

APPARATUS FOR STRIPPING COVERED STRANDS

Application filed September 20, 1928. Serial No. 307,281.

This invention relates to apparatus for stripping covered strands, and more particularly to apparatus for stripping insulated electrical conductors.

The object of the invention is to provide an apparatus for stripping or displacing the coverings of continuously covered strands for predetermined lengths and at predetermined intervals throughout their length with speed, accuracy and a minimum of attention.

In accordance with one embodiment of the invention, as applied to an apparatus for stripping the insulation on electrical conductors, there is provided a rotating drum which carries a plurality of clamping devices operated at predetermined points during the rotation of the drum to clamp a pair of twisted insulated conductors being advanced by the drum. The drum also carries a plurality of cutting members, and a gyratory member which causes them to sever the insulation at spaced intervals, and which also successively moves each of the cutting members longitudinally of the conductors, thus displacing the insulation along the conductor cores for a predetermined distance and exposing the cores. Thereafter the cutting members are successively retracted from the conductors, and the conductors are finally unclamped from the drum and wound upon a take-up reel or other suitable mechanism.

Other objects and advantages of the invention will more fully appear from the accompanying detailed description taken in connection with the accompanying drawings which illustrate one embodiment thereof, in which Fig. 1 is a fragmentary plan view of a conductor stripping apparatus embodying the features of the invention, Fig. 2 is an enlarged sectional view taken upon the line 2—2 of Fig. 1, Fig. 3 is a sectional view taken upon the line 3—3 of Fig. 2, Fig. 4 is an enlarged view of a section taken in the direction of the line 4—4 of Fig. 3, showing the conductors at the completion of the insulation severing operation, and Fig. 5 is an enlarged view of a section taken in the direction of line 5—5 of Fig. 3, showing the conductors at the completion of the insulation stripping operation, the insulation being moved back to expose the cores.

As shown in the accompanying drawings, the apparatus is supported upon a base plate 10 having arranged thereon at the left end (Fig. 1) a supply reel 11 carrying, in the particular embodiment illustrated, a supply of insulated electrical conductors 12 which are to be exposed for a predetermined distance and at predetermined intervals along their length, the conductors being arranged in pairs having a comparatively long twist. The supply reel 11 is rotatably supported upon an overhanging rotatable arbor 13 carried by a standard 14 provided with a pair of spaced journals 17 and 18. Fixed to the arbor 13 between one head of the reel 11 and the journal 17 is a collar 19, and surrounding the arbor 13 between the journals 17 and 18 is a compression spring 20, an anti-friction collar 21 being carried free upon the arbor 13 between one end of the spring 20 and the journal 17, with a collar 24 carried upon the arbor 13 and abutting the opposite end of the spring 20. The reel 11 is secured to the arbor 13 by a hand nut 25 screw-threaded upon the arbor 13, the nut 25 serving to clamp the reel 11 against the collar 19. It will be apparent that upon adjustment of the collar 24 to suitably compress the spring 20, sufficient friction will be maintained between the collar 19 and the journal 17 to provide a sufficient drag upon the reel to prevent overrunning thereof during operation of the apparatus.

Intermediate the supply reel 11 and a take-up apparatus 26, to be described hereinafter, is a base plate 27 having a pair of spaced upright standards 28 and 29 provided with journals 31 and 32 respectively, rotatably supporting a shaft 33, the shaft being driven in a counter-clockwise direction (Fig. 2) at a predetermined uniform speed through a suitable source of power (not shown). Rotatably carried upon a pair of stationary studs 34, fixed to the standard 29 in a horizontal plane above the axis of the shaft 33 and equally spaced therefrom is a pair of grooved guide rollers 35—35 (Figs. 1 and 2).

Fixed to the shaft 33 intermediate the standards 28 and 29 by means of a setscrew 30 is a drum 38 having a cover plate 61 secured thereto by screws 62, the drum being provided with a plurality of integral segmental blocks 36 separated by channels 37 which communicate with an inner recess 44 in the drum 38. On its peripheral surface, the drum is provided with a continuous groove 39, which is in line with the guide rollers 35—35 and adapted to loosely receive the conductors 12.

Seated in sockets in the drum 38 is a plurality of spring pressed plungers 40 which are actuated by a stationary face cam 41 to cause the conductors to be gripped within the groove 39 at predetermined points in the rotation of the drum 38. Cam 41 is secured to the standard 29 by means of screws 45. The plungers 40 serve to grip the wires to enable the drum 38 to advance them, as will be explained more fully in the description of operation of the apparatus. The plungers 40 are each actuated through the movement of a reciprocable sleeve 42, the rear end of which carries a button 43 arranged to ride upon the cam 41. Mounted between each sleeve 42 and the end wall of the socket in which the sleeve is seated is a compression spring 46. The plunger 40 is provided with a head 47 having a sliding fit within the bore of the sleeve 42, and carried within the sleeve between the head 47 and the button 43 is a second compression spring 48 through which the movement of the button 43 is yieldingly transmitted to the plunger 40 to cause the latter to grip the conductors and prevent longitudinal movement thereof, as shown at the bottom of Fig. 3. Upon the button 43 riding onto the low point 49 of the cam 41 the compression spring 46 serves to withdraw the plunger 40 from the conductors, the spring being compressed during the gripping of the conductors as will readily be seen. It will be apparent that any slight variation in the diameter of the conductors to be stripped will be compensated for by the yielding of the spring 48.

Adjustably fixed to the standard 28 by means of a plurality of bolts 51 is an eccentric 50 which receives the shaft 33 in rotatable relation, and a collar 53 is rotatably mounted on eccentric 50 in the recess 44 of drum 38. Collar 53 is provided with a peripheral groove wherein are pivoted, by means of pins 55, the inner ends of a plurality of knife holders 56 which extend outwardly therefrom in the channels 37 of the drum 38. Each of the knife holders has sliding engagement in a slotted cylindrical block 57 mounted for oscillation in the corresponding channel 37 by means of cylindrical depressions formed in the walls of the adjacent segmental blocks 36, as best shown in Figs. 4 and 5. Collar 53 is coupled to drum 38 by means of a coupling member 58 having on one of its faces a tongue 59 slidably engaging in a corresponding diametric slot formed in collar 53, and having on its opposite face a second tongue 60 extending transversely of tongue 59 and slidably engaging in a corresponding slot 63 formed in drum 38. This arrangement forms a driving connection between drum 38 and collar 53, while permitting the collar to gyrate or move eccentrically with respect to the drum. It will be seen that when drum 38 is rotated in the counter-clockwise direction as viewed in Fig. 2 the eccentric 50 will cause collar 53 to gyrate with respect to the drum, thereby successively moving knife holders 56 from the retracted position seen at the top of Fig. 2 to the extended position seen at the bottom of the same figure, and back to the retracted position.

In the embodiment illustrated in Fig. 2, each knife holder 56 reaches the limit of its inward movement when it reaches its uppermost position, but it will be understood that the machine may be adjusted by loosening bolts 51 and rotating eccentric 50 to a new position, to thereby advance or retard the point of extreme inward movement as desired. It will also be seen that the movement of the knife holders is not truly radial with respect to shaft 33, but that they and their associated blocks 57 have a rotary motion in the channels 37 which causes the outer ends of the knife holders to move not only transversely but also longitudinally of the conductors 12 to skin or strip the insulation therefrom, as will be more fully described below.

A knife 68, which is best shown in Figs. 4 and 5, is carried in a slot formed at the outer end of each of the knife holders 56, the knives each being provided with a base portion 69 which fits in the slot in its respective holder, and being secured in position therein by a pair of screws 70. The knives and the knife holders are slotted at their outer ends as indicated at 71 in Fig. 3, the slots being aligned with the conductors which are clamped in the peripheral groove 39 of the drum 38 so that as the knife holders are moved outwardly, the conductors spanning the channels 37 will be entered within the slots 71, as indicated in Fig. 4. The width of the slots 71 of the knife holders is substantially the same as the diameter of the wire cores of the conductors, so that the slots serve as a guide for the wire. The outer ends of the slots in the knives are each formed with a rounded portion 72 for the purpose of guiding the conductors, and cutting edges are formed upon the rounded portions, the groove 39 of the drum 38 being similarly rounded or chamfered. As any one of the knives is moved outwardly in its channel 37, the conductors are first centered with respect to the slot 71 in the knife and the holder due to the rounded cutting portion 72 of the knife. The balance of the slot 71 of the knife has parallel sides and is of such a width that the conductor core may be entered therein without injury. The cutting edges at 72, during their movement past the conductors, serve to partly sever the insulation thereof, as will readily be apparent, and when they reach the position shown in Fig. 4, the cores will be entered in the narrow inner portion of the slot 71, leaving only two small diametrically opposed portions of the insulation unsevered on each conductor. Thereafter, the movement of the knife longitudinally of the conductors completes the severing of the insulation and compacts and deforms it to the form shown in Fig. 5, the friction of the insulation on the cores being sufficient to prevent its return to its normal position.

The apparatus 26 for taking up the stripped conductors 12 as delivered from the stripping apparatus will now be described in detail. A bracket 83 secured to the base plate 10 is provided with a plurality of horizontally disposed journals 84, 85, 86 and 87. Carried by the journals 86 and 87 is a reciprocal and rotatable arbor 88 which has splined thereto, as indicated at 91, a grooved pulley 92, receiving motion from a similar pulley 93 of larger diameter fixed to the shaft 33 of the stripping apparatus through a belt 94, the belt traveling in the direction indicated by the arrow. Secured to the hub of the pulley 92 and abutting the adjacent vertical face of the journal 86 is a gear 95, the axis of which is the arbor 88. Meshing with the gear 95 is a gear 96 secured to a reverse screw-threaded shaft 99 rotatably supported in the journals 84 and 85. The shaft 99 forms part of a distributing or traversing mechanism of a well known type indicated generally by the numeral 100, which it is believed will not need any further description, since this type of mechanism is well known in the art of strand coiling. Fixed to the upper end of the arbor 88, as viewed in Fig. 1, is a collar 101 provided with a circular channel 102 within which extends an operative connection 103 from the mechanism 100.

A take-up reel 104 is secured to the arbor 88 by a hand nut 105 screw-threaded upon the arbor 88, the nut serving to clamp the reel 104 against a collar 106 which is fixed to the arbor 88. As the shaft 33 rotates in a counter-clockwise direction it will be apparent that the arbor 88 will be rotated in a similar direction and through the gears 95 and 96 the reverse screw-threaded shaft 99 will be rotated in a clockwise direction to reciprocate the mechanism 100 thereon, the connection 103 and collar 101 transmitting such motion to the rotating arbor 88 carrying the reel 104, thus causing the stripped conductors to be wound upon the reel 104 in even layers.

The operation of the apparatus is as follows: Assuming that a supply reel 11 of conductors to be stripped and an empty take-up reel 104 have been properly positioned upon the arbors 13 and 88 respectively, and the conductors properly threaded from the reel 11, around the drum 38 and secured to the reel 104, the shaft 33 carrying the drum 38 is caused to rotate in the direction indicated by the arrow in Fig. 2. The conductors are guided from the left hand roller 35 (Fig. 2) and into the groove 39 of the drum 38, the spring pressed plungers 40 being in their retracted position between the dotted lines 108 and 109 of Fig. 2, between which lines the low point 49 of the cam 41 occurs. While any given knife holder 56 is being rotated from the position shown at the top of Fig. 2 to the position shown at the bottom of the figure, it is moved outwardly, as hereinbefore explained, due to the gyratory movement of collar 53. This causes the knife 68 carried by the holder to move into engagement with the insulation of the conductors within the channel 37, as indicated in Fig. 4, at the same time, owing to the oscillation of block 57, moving longitudinally of the conductors to permanently deform the insulation and thereby expose the cores, as shown in Fig. 5. As the drum 38 continues to rotate, the movement of the knife longitudinally with respect to the conductors continues, but the outward movement of the knife ceases when the knife reaches the position shown at the bottom of Fig. 2, and from that point on the knife moves inwardly until fully retracted. In the rotation of the wheel the spring plungers 40, in succession, release their grip upon the conductors upon reaching the point 108 of the cam face 41, the conductors passing around the right hand roller 35 (Fig. 2) and thence being wound upon the reel 104 in the manner hereinbefore described.

Due to the balanced construction of the apparatus and the fact that it is continuously, rather than intermittently, rotated, the twisted conductors to be stripped may be drawn from the supply reel at a substantially constant speed with a substantially uniform tension. This allows the apparatus to be operated at a relatively high speed, and since the insulation is stripped from the conductors at several points thereof during every revolution of the drum 38 the output is very large.

While the apparatus is here shown as operating upon a pair of twisted conductors, it will be obvious that it is equally well adapted to strip either a greater number of conductors similarly twisted or a single conductor.

What is claimed is:

1. In an apparatus for stripping a covered strand, means for continuously advancing successive portions of the strand along a predetermined path, a severing member mounted adjacent said path, and common means for moving the severing member transversely of the continuously advancing strand to sever the covering thereof and longitudinally of the strand to strip the covering from the strand.

2. In an apparatus for stripping a covered strand, means for advancing successive portions of the strand along a predetermined path, a plurality of severing members mounted adjacent said path and advancing with the strand, and common means for moving the severing members transversely of the strand to sever the covering thereof at spaced points, said common means being also operative to move the severing members longitudinally of the strand to strip the covering from the strand.

3. In an apparatus for stripping a covered strand, means for continuously advancing successive portions of the strand through a predetermined path, a plurality of severing members mounted adjacent said path, and an actuating member pivotally connected to the several severing members and operative to move the same both transversely and longitudinally of the continuously advancing strand.

4. In an apparatus for stripping a covered strand, a movable strand advancing member, a severing member pivotally and slidably mounted on the strand advancing member, and an actuating member pivotally connected to said severing member and operative upon movement of the strand advancing member to simultaneously move the severing member transversely and longitudinally of the strand.

5. In an apparatus for stripping a covered strand, a rotary strand receiving member, a plurality of severing members pivotally and slidably mounted on the strand receiving member, and a gyratory actuating member pivotally connected to each of the severing members and operative upon rotation of the strand receiving member to simultaneously move the severing members transversely and longitudinally of the strand to sever the covering thereof and strip the covering from the strand.

6. In an apparatus for stripping a covered strand, a rotary strand receiving member, an oscillatory member carried thereby, a stripping member slidably related to the oscillatory member, and an actuating member connected to the stripping member and operating upon rotation of the strand receiving member to move the stripping member transversely and longitudinally of the strand.

7. In an apparatus for stripping a covered strand, a strand receiving member, a cylindrical, oscillatory member carried thereby, a stripping member slidably mounted in the cylindrical, oscillatory member, and common means for moving the stripping member through the medium of the oscillatory member both transversely and longitudinally of the strand.

8. In a stripping apparatus, a material receiving member adapted first to grip and later release the material to be stripped, a cylindrical oscillatory member carried thereby, a stripping member slidably mounted in the cylindrical, oscillatory member, and common means for moving the stripping member and the oscillatory member in combination to actuate the stripping member both transversely and longitudinally of the material to strip it.

9. In a stripping apparatus, a traveling material receiving member, means associated with the material receiving member for gripping and releasing the material at predetermined points in its travel, a slidable member pivotally related to the material receiving member, and a gyratory member connected to the slidable member for moving the same transversely and longitudinally of the material.

10. In a stripping apparatus, means for continuously advancing material, a slidable member pivotally related to the advancing means, and a gyratory member connected to the slidable member and adapted to move the same transversely and longitudinally of the material.

11. In a wire skinning machine, a rotatable drum, a series of knives movably mounted on said drum, a gyratory member, means for feeding insulated wire over said drum, and means for rotating said drum to cause said gyratory member to move said knives transversely and longitudinally of the wire for removing the insulation from said wire at predetermined intervals.

12. In a wire skinning machine, a rotating drum, a series of knives movably mounted on said drum, means for feeding insulated wire over said drum, and means including a gyratory member for moving said knives transversely and longitudinally of the wire for removing the insulation therefrom.

13. In an apparatus for stripping a covered strand, means for continuously advancing successive portions of the strand, a severing member mounted adjacent to the advancing strand for removing a portion of the covering therefrom, and common means for moving the severing member both to remove the covering and to retract the severing member to its original position.

14. In an apparatus for stripping a covered strand, means for continuously advancing successive portions of the strand, a severing member mounted adjacent to the advancing strand for removing a portion of the covering therefrom, and a gyratory member for moving the severing member both to remove the covering and to retract the severing member to its original position.

15. In an apparatus for intermittently stripping a continuous covered strand, rotating means for continuously advancing the strand, a severing member carried by the rotative means, and common means moving in cooperation with the rotating means for actuating the severing member both transversely and longitudinally of the strand to strip it.

16. In an apparatus for intermittently stripping a continuous covered strand, a drum for continuously advancing the strand, a severing member carried by the drum, and a common cam moving in cooperation with the drum for actuating the severing member both transversely and longitudinally of the strand to strip it.

17. In an apparatus for intermittently stripping a continuous covered strand, a drum for continuously advancing the strand, a plurality of severing members carried by the drum, and a common gyratory member moving in cooperation with the drum for actuating the severing member both transversely and longitudinally of the strand to strip it.

In witness whereof, I hereunto subscribe my name this 8th day of September, A. D. 1928.

PAUL B. WEIS.